US012786110B2

(12) United States Patent
Singh et al.

(10) Patent No.: US 12,786,110 B2
(45) Date of Patent: Nov. 3, 2026

(54) METHODS, SYSTEMS, AND COMPUTER READABLE MEDIA FOR DYNAMIC INTER-SERVICE COMMUNICATION PROXY (SCP) ROUTING USING REMOTE PRODUCER NETWORK FUNCTION (NF) INSTANCE PATH REACHABILITY INFORMATION

(71) Applicant: Oracle International Corporation, Redwood Shores, CA (US)

(72) Inventors: Virendra Singh, Bangalore (IN); Shashikiran Bhalachandra Mahalank, Bangalore (IN); Jay Rajput, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 274 days.

(21) Appl. No.: 18/636,113

(22) Filed: Apr. 15, 2024

(65) Prior Publication Data

US 2025/0323861 A1 Oct. 16, 2025

(51) Int. Cl.
*H04L 45/28* (2022.01)
*H04L 43/0811* (2022.01)
*H04L 67/564* (2022.01)

(52) U.S. Cl.
CPC .......... *H04L 45/28* (2013.01); *H04L 43/0811* (2013.01); *H04L 67/564* (2022.05)

(58) Field of Classification Search
CPC ..... H04L 45/28; H04L 43/0811; H04L 67/564
See application file for complete search history.

(56) References Cited

U.S. PATENT DOCUMENTS 10,764,214 B1 9/2020 Plenderleith
10,833,938 B1 11/2020 Rajput et al.
(Continued)

FOREIGN PATENT DOCUMENTS

CN 115243278 A 10/2022
WO WO 2021/013321 A1 1/2021
(Continued)

OTHER PUBLICATIONS

"3rd Generation Partnership Project; Technical Specification Group Services and System Aspects; Security architecture and procedures for 5G system (Release 18)", 3GPP TS 33.501, V18.5.0, pp. 1-330 (Mar. 2024).
(Continued)

*Primary Examiner* — Ivan O Latorre
(74) *Attorney, Agent, or Firm* — Jenkins, Taylor & Hunt, P.A.

(57) ABSTRACT

A method for dynamic inter-service communication proxy (SCP) routing using remote producer network function (NF) instance path reachability information includes detecting, by a first producer SCP instance, unreachability of a producer NF instance. The method further includes communicating, by the first producer SCP instance and to an NF repository function (NRF) instance, an indication that the producer NF instance is unreachable via the first producer SCP instance. The method further includes storing, by the NRF instance, the indication that the producer NF instance is unreachable via the first producer SCP instance. The method further includes communicating, by the NRF instance and to a consumer SCP instance, the indication that the producer NF instance is unreachable via the first producer SCP instance.

16 Claims, 8 Drawing Sheets

(56) References Cited

U.S. PATENT DOCUMENTS

| | | | | |
|---|---|---|---|---|
| 11,290,549 | B2 | 3/2022 | Krishan | |
| 11,528,334 | B2 * | 12/2022 | Krishan | H04L 45/74 |
| 11,611,626 | B1 * | 3/2023 | Srivastava | H04L 67/51 |
| 11,831,732 | B2 | 11/2023 | Singh et al. | |
| 11,876,703 | B2 * | 1/2024 | Bartolome Rodrigo | H04L 45/304 |
| 12,155,534 | B1 * | 11/2024 | Bertz | H04L 41/12 |
| 12,245,056 | B2 | 3/2025 | Rajput et al. | |
| 12,513,052 | B2 | 12/2025 | Singh et al. | |
| 2020/0389935 | A1 * | 12/2020 | Jeong | H04W 24/04 |
| 2021/0092005 | A1 | 3/2021 | Kaul | |
| 2021/0099856 | A1 * | 4/2021 | Cakulev | H04W 24/02 |
| 2021/0306203 | A1 * | 9/2021 | Landais | H04L 67/02 |
| 2022/0053372 | A1 * | 2/2022 | Shekhar | H04L 67/56 |
| 2022/0060547 | A1 * | 2/2022 | Krishan | H04L 67/56 |
| 2022/0070648 | A1 * | 3/2022 | Krishan | H04L 67/562 |
| 2022/0131945 | A1 * | 4/2022 | Sapra | H04L 47/12 |
| 2022/0159464 | A1 * | 5/2022 | Rajput | H04W 48/08 |
| 2022/0224589 | A1 | 7/2022 | Das et al. | |
| 2022/0224760 | A1 | 7/2022 | Foti et al. | |
| 2022/0240171 | A1 * | 7/2022 | Singh | H04W 48/18 |
| 2022/0303793 | A1 * | 9/2022 | Patil | H04W 24/04 |
| 2022/0330085 | A1 | 10/2022 | Li | |
| 2022/0345379 | A1 | 10/2022 | Li | |
| 2022/0360447 | A1 * | 11/2022 | Rajput | H04L 9/3247 |
| 2022/0393971 | A1 * | 12/2022 | Bartolome Rodrigo | H04L 45/02 |
| 2023/0072290 | A1 * | 3/2023 | Rajput | H04L 63/0281 |
| 2023/0147549 | A1 | 5/2023 | Singh et al. | |
| 2023/0217355 | A1 * | 7/2023 | Srivastava | H04L 41/0654 370/329 |
| 2023/0232322 | A1 * | 7/2023 | Singh | H04W 60/00 370/329 |
| 2023/0291818 | A1 * | 9/2023 | Yang | H04L 67/563 |
| 2023/0308908 | A1 * | 9/2023 | Rajput | H04W 24/04 |
| 2023/0318960 | A1 * | 10/2023 | Krishan | H04L 45/34 370/389 |
| 2023/0388230 | A1 * | 11/2023 | Krishan | H04L 45/745 |
| 2023/0413214 | A1 * | 12/2023 | Khare | H04L 43/10 |
| 2023/0421648 | A1 * | 12/2023 | Saride | H04L 67/63 |
| 2024/0179210 | A1 * | 5/2024 | Rodrigo | H04L 67/51 |
| 2024/0305541 | A1 | 9/2024 | Singarayan et al. | |
| 2024/0305543 | A1 | 9/2024 | Singarayan et al. | |
| 2024/0388525 | A1 * | 11/2024 | Lu | H04L 45/18 |
| 2025/0047655 | A1 * | 2/2025 | Krishnamurthy | H04L 63/0807 |
| 2025/0119475 | A1 * | 4/2025 | Sun | H04L 9/32 |
| 2025/0142317 | A1 | 5/2025 | Sharma et al. | |
| 2025/0267088 | A1 * | 8/2025 | Singh | H04L 45/24 |
| 2025/0280332 | A1 * | 9/2025 | Yang | H04W 36/08 |
| 2025/0323861 | A1 * | 10/2025 | Singh | H04L 43/0811 |
| 2025/0330407 | A1 * | 10/2025 | Goel | H04L 43/10 |
| 2025/0337652 | A1 | 10/2025 | Singh et al. | |
| 2025/0380163 | A1 * | 12/2025 | Mishra | H04W 24/04 |
| 2025/0380209 | A1 * | 12/2025 | Mishra | H04W 48/16 |
| 2026/0005946 | A1 * | 1/2026 | Singh | H04L 43/0882 |

FOREIGN PATENT DOCUMENTS

| | | | |
|---|---|---|---|
| WO | WO 2022/066078 | A1 | 3/2022 |
| WO | WO 2025/178658 | A1 | 8/2025 |

OTHER PUBLICATIONS

"3rd Generation Partnership Project; Technical Specification Group Core Network and Terminals; 5G System; Technical Realization of Service Based Architecture; Stage 3 (Release 18)", 3GPP TS 29.500, V18.5.0, pp. 1-150 (Mar. 2024).

"3rd Generation Partnership Project; Technical Specification Group Core Network and Terminals; 5G System; Network Function Repository Services; Stage 3 (Release 18)", 3GPP TS 29.510, V18.5.0, pp. 1-382 (Dec. 2023).

Non-Final Office Action for U.S. Appl. No. 17/706,557 (Jun. 20, 2024).

"3rd Generation Partnership Project; Technical Specification Group Services and System Aspects; System architecture for the 5G System (5GS); Stage 2 (Release 18)", 3GPP TS 23.501, V18.4.0, pp. 1-706 (Dec. 2023).

"3rd Generation Partnership Project; Technical Specification Group Core Network and Terminals; 5G System; Unified Data Management Services; Stage 3 (Release 18)", 3GPP TS 29.503, V18.4.0, pp. 1-660 (Dec. 2023).

"3rd Generation Partnership Project; Technical Specification Group Core Network and Terminals; 5G System; Network Function Repository Services; Stage 3 (Release 18)", 3GPP TS 29.510, V18.4.0, pp. 1-399 (Sep. 2023).

Notice of Allowance and Fees Due for U.S. Appl. No. 17/524,711 (Aug. 24, 2023).

Non-Final Office Action for U.S. Appl. No. 17/524,711 (Apr. 19, 2023).

Non-Final Office Action for U.S. Appl. No. 17/524,711 (Oct. 5, 2022).

Commonly-Assigned, co-pending U.S. Appl. No. 17/706,557 for "Methods, Systems, and Computer Readable Media for Error Information Propagation From Service Communication Proxy (SCP) to Consumer Network Function (NF) to Support Circuit Breaker Design Pattern at Consumer NF," (Unpublished, filed Mar. 28, 2022).

"Circuit Breaker Pattern," Azure Architecture Center, Microsoft Docs, pp. 1-14 (Mar. 9, 2022).

"3rd Generation Partnership Project; Technical Specification Group Services and System Aspects; System architecture for the 5G System (5GS); Stage 2 (Release 17)," 3GPP TS 23.501, V17.3.0, pp. 1-559 (Dec. 2021).

Nygard, "Circuit Breaker," Release It!, 2nd Edition, pp. 1-3 (Jan. 30, 2018).

"3rd Generation Partnership Project; Technical Specification Group Services and System Aspects; Security architecture and procedures for 5G system (Release 17)," 3GPP TS 33.501, V17.3.0, pp. 1-258 (Sep. 2021).

"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).

"3rd Generation Partnership Project; Technical Specification Group Core Network and Terminals; 5G System; Principles and Guidelines for Services Definition; Stage 3 (Release 17)," 3GPP TS 29.501, V17.3.1, pp. 1-78 (Sep. 2021).

"3rd Generation Partnership Project; Technical Specification Group Services and System Aspects; Procedures for the 5G System (5GS); Stage 2 (Release 17)," 3GPP TS 23.502, V17.2.1, pp. 1-712 (Sep. 2021).

"3rd Generation Partnership Project; Technical Specification Group Core Network and Terminals; 5G System; Technical Realization of Service Based Architecture; Stage 3 (Release 17)," 3GPP TS 29.500, V17.4.0, pp. 1-109 (Sep. 2021).

"3rd Generation Partnership Project; Technical Specification Group Services and System Aspects; System architecture for the 5G System (5GS); Stage 2 (Release 17)," 3GPP TS 23.501, V17.2.0, pp. 1-542 (Sep. 2021).

Notice of Allowance for U.S. Appl. No. 17/706,557, filed Oct. 25, 2024.

"3rd Generation Partnership Project; Technical Specification Group Services and System Aspects; System architecture for the 5G System (5GS); Stage 2 (Release 17)", 3GPP TS 23.501, V17.11.0, pp. 1-573 (Dec. 2023).

"3rd Generation Partnership Project; Technical Specification Group Core Network and Terminals; 5G System; Technical Realization of Service Based Architecture; Stage 3 (Release 18)", 3GPP, TS 29.500, V18.4.0, pp. 1-145 (Dec. 2023).

Notification of Transmittal of the International Search Report and the Written Opinion of the International Searching Authority, or the Declaration for International Patent Application Serial No. PCT/US2024/053764 (Jan. 27, 2025).

Commonly-Assigned, co-pending U.S. Appl. No. 17/706,557 for "Methods, Systems, and Computer Readable Media for Synthetic Monitoring of Network Function (NF) Service Instances and Auto-

(56) References Cited

OTHER PUBLICATIONS mated Updating of Routing Rules by Service Communication Proxy (SCP)," (Unpublished, filed Mar. 28, 2022).
Commonly-Assigned, co-pending U.S. Appl. No. 19/071,320 for "Methods, Systems, and Computer Readable Media for Synthetic Monitoring of Network Function (NF) Service Instances and Providing Enhanced NF Discovery Using NF Repository Function (NRF)," (Unpublished, filed Mar. 5, 2025).
Ex-parte Quayle Action for U.S. Appl. No. 18/581,214, filed Jan. 9, 2026.
Non-Final Office Action for U.S. Appl. No. 18/581,214, filed Jul. 1, 2026.
Notice of Allowance for U.S. Appl. No. 19/071,320, filed Jun. 9, 2026.
Notice of Allowance for U.S. Appl. No. 18/581,214, filed Apr. 13, 2026.
Notice of Allowance for U.S. Appl. No. 18/581,214, filed May 6, 2026.
Notice of Allowance for U.S. Appl. No. 18/581,214 (Aug. 13, 2026).

* cited by examiner

METHODS, SYSTEMS, AND COMPUTER READABLE MEDIA FOR DYNAMIC INTER-SERVICE COMMUNICATION PROXY (SCP) ROUTING USING REMOTE PRODUCER NETWORK FUNCTION (NF) INSTANCE PATH REACHABILITY INFORMATION

TECHNICAL FIELD

The subject matter described herein relates to routing messages between NF service consumers and NF service producers. More particularly, the subject matter described herein relates to dynamic inter-SCP routing using remote producer NF instance path reachability information.

BACKGROUND

In 5G telecommunications networks, a network function that provides service is referred to as a producer NF or service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF service instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides one or more services. A given producer NF may include more than one NF instance and more than one NF service instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

An SCP can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF service instances.

One problem that can occur in 5G and subsequent generation networks relates to selecting an SCP for forwarding messages to a remote producer NF when there are at least two SCPs between an NF service consumer and an NF service producer. In the case of 3GPP communication model C or model D where more than one SCP lies in the path between the NF service consumer and the NF service producer, an SCP, referred to as a consumer SCP, receives a service request message from an NF service consumer and performs producer NF path selection to select the next-hop SCP for reaching the NF service producer. For simplicity of illustration, in this example, it is assumed that the NF service producer can be reached via two SCPs—the consumer SCP and the SCP serving the NF service producer (referred to as the producer SCP). It is understood that the path between an NF service consumer and an NF service producer may include more than two SCPs. In this two-SCP example, the consumer SCP performs producer SCP selection and forwards the service request to the producer SCP. If an NF service producer becomes unreachable via the producer SCP, a request message timeout will occur, the consumer SCP will select an alternate next-hop SCP for reaching the NF service producer, and the consumer SCP will retransmit the service request message to the alternate producer SCP. The alternate producer SCP will forward the service request message to the producer NF instance. The initial failed routing attempt to the producer SCP is inefficient and wastes processing resources of the consumer SCP, the producer SCP, and inter-SCP network bandwidth.

Accordingly, in light of these and other difficulties, there exists a need for improved methods, systems, and computer readable media for inter-SCP routing.

SUMMARY

A method for dynamic inter-service communication proxy (SCP) routing using remote producer network function (NF) path reachability information includes detecting, by a first producer SCP instance, unreachability of a producer NF instance. The method further includes communicating, by the first producer SCP instance and to an NF repository function (NRF) instance, an indication that the producer NF instance is unreachable via the first producer SCP instance. The method further includes storing, by the NRF instance, the indication that the producer NF instance is unreachable via the first producer SCP instance. The method further includes communicating, by the NRF instance and to a consumer SCP instance, the indication that the producer NF instance is unreachable via the first producer SCP instance.

According to another aspect of the subject matter described herein, detecting unreachability of the producer NF instance includes detecting a transport layer connection failure with the producer NF instance.

According to another aspect of the subject matter described herein, detecting unreachability of the producer NF instance includes detecting unreachability of the producer NF instance via synthetic monitoring.

According to another aspect of the subject matter described herein, communicating, to the NRF instance, the indication that the producer NF instance is unreachable via the first SCP instance includes transmitting an NF update message from the first producer SCP instance to the NRF instance.

According to another aspect of the subject matter described herein, communicating, to the NRF instance, the indication that the producer NF instance is unreachable via the first producer SCP instance includes creating a vendor-specific information element (IE) including the indication that the producer NF instance is unreachable, adding the vendor-specific IE to an SCP profile of the first producer SCP instance, and transmitting the SCP profile including the vendor-specific IE with the NF update message to the NRF instance.

According to another aspect of the subject matter described herein, creating the vendor-specific IE comprises including, in the vendor-specific IE, a producer NF instance ID of the producer NF instance, an NF service instance ID associated with a service provided by the producer NF instance, the indication that the first producer SCP instance is unreachable, and a timestamp.

According to another aspect of the subject matter described herein, communicating, to the consumer SCP instance, the indication that the producer NF instance is unreachable via the first SCP instance includes utilizing an Nnrf_NFManagement service.

According to another aspect of the subject matter described herein, communicating, to the consumer SCP instance, the indication that the producer NF instance is unreachable via the first producer SCP instance utilizing the Nnrf_NFManagement service includes communicating the indication that the producer NF instance is unreachable via the first producer SCP instance in an NFStatusNotify message transmitted from the NRF instance to the consumer SCP instance, where the NFStatusNotify message includes the SCP profile of the first producer SCP instance and the SCP profile includes the vendor-specific IE carrying the indication that the producer NF instance is unreachable.

According to another aspect of the subject matter described herein, communicating, to the consumer SCP instance, the indication that the producer NF instance is unreachable via the first producer SCP instance utilizing the Nnrf_NFManagement service includes communicating the indication that the producer NF instance is unreachable in an NFProfileRetrieval response message transmitted from the NRF instance to the consumer SCP instance, where the NFProfileRetrieval response message includes the SCP profile of the first producer SCP including the vendor-specific IE carrying the indication that the producer NF instance is unreachable.

According to another aspect of the subject matter described herein, the method for dynamic inter-SCP routing includes receiving, by the consumer SCP instance, the indication that the producer NF instance is unreachable via the first producer SCP instance, selecting, by the consumer SCP instance and in response to receiving the indication that the producer NF instance is unreachable via the first SCP instance, a second producer SCP instance for forwarding service-based interface (SBI) request messages to the producer NF instance, and forwarding, by the consumer SCP instance, an SBI request message to the producer NF instance via the second producer SCP instance.

According to another aspect of the subject matter described herein, a system for dynamic inter-service communication proxy (SCP) routing using remote producer network function (NF) path reachability information is provided. The system includes a producer SCP including at least one processor and a memory for detecting unreachability of a producer NF instance and communicating an indication that the producer NF instance is unreachable via the producer SCP. The system further includes an NF repository function (NRF) including at least one processor and a memory for receiving, from the producer SCP, the indication that the producer NF instance is unreachable via the producer SCP, storing the indication that the producer NF instance is unreachable via the producer SCP, and communicating, to a consumer SCP instance, the indication that the producer NF instance is unreachable via the producer SCP.

According to another aspect of the subject matter described herein, the producer SCP is configured to detect unreachability of the producer NF instance by detecting a transport layer connection failure with the producer NF instance.

According to another aspect of the subject matter described herein, the producer SCP is configured to detect unreachability of the producer NF instance via synthetic monitoring.

According to another aspect of the subject matter described herein, the producer SCP is configured to communicate, to the NRF, the indication that the producer NF instance is unreachable via the producer SCP by transmitting an NF update message from the producer SCP to the NRF.

According to another aspect of the subject matter described herein, the producer SCP is configured to communicate, to the NRF, the indication that the producer NF instance is unreachable via the producer SCP by creating a vendor-specific information element (IE) including the indication that the producer NF instance is unreachable, adding the vendor-specific IE to an SCP profile of the producer SCP, and transmitting the SCP profile including the vendor-specific IE with the NF update message to the NRF.

According to another aspect of the subject matter described herein, the producer SCP is configured to include, in the vendor-specific IE, a producer NF instance ID of the producer NF, an NF service instance ID associated with a service provided by the producer NF, the indication that the producer SCP is unreachable, and a timestamp.

According to another aspect of the subject matter described herein, the NRF is configured to communicate, to the consumer SCP instance, the indication that the producer NF instance is unreachable via the producer SCP by utilizing an Nnrf_NFManagement service.

According to another aspect of the subject matter described herein, the NRF is configured to communicate, to the consumer SCP instance, the indication that the producer NF is unreachable via the producer SCP utilizing the Nnrf_NFManagement service by communicating the indication that the producer NF instance is unreachable via the producer SCP in an NFStatusNotify message transmitted from the NRF to the consumer SCP instance, where the NFStatusNotify message includes the SCP profile of the producer SCP and the SCP profile includes the vendor-specific IE carrying the indication that the producer NF instance is unreachable.

According to another aspect of the subject matter described herein, the NRF is configured to communicate, to the consumer SCP instance, the indication that the producer NF instance is unreachable via the producer SCP utilizing the Nnrf_NFManagement service by communicating the indication that the producer NF instance is unreachable in an NFProfileRetrieval response message transmitted from the NRF to the consumer SCP instance, where the NFProfileRetrieval response message includes the SCP profile of the producer SCP including the vendor-specific IE carrying the indication that the producer NF instance is unreachable.

According to another aspect of the subject matter described herein, a non-transitory computer readable medium having stored thereon executable instructions that when executed by a processor of a computer control the computer to perform steps is provided. The steps include detecting, by a producer service communication proxy (SCP) instance, unreachability of a producer network function (NF) instance. The steps further include communicating, by the producer SCP instance and to an NF repository function (NRF) instance, an indication that the producer NF instance is unreachable via the producer SCP instance. The steps further include storing, by the NRF instance, the indication that the producer NF instance is unreachable via the producer SCP instance. The steps further include communicating, by the NRF instance and to a consumer SCP instance, the indication that the producer NF instance is unreachable via the producer SCP instance.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
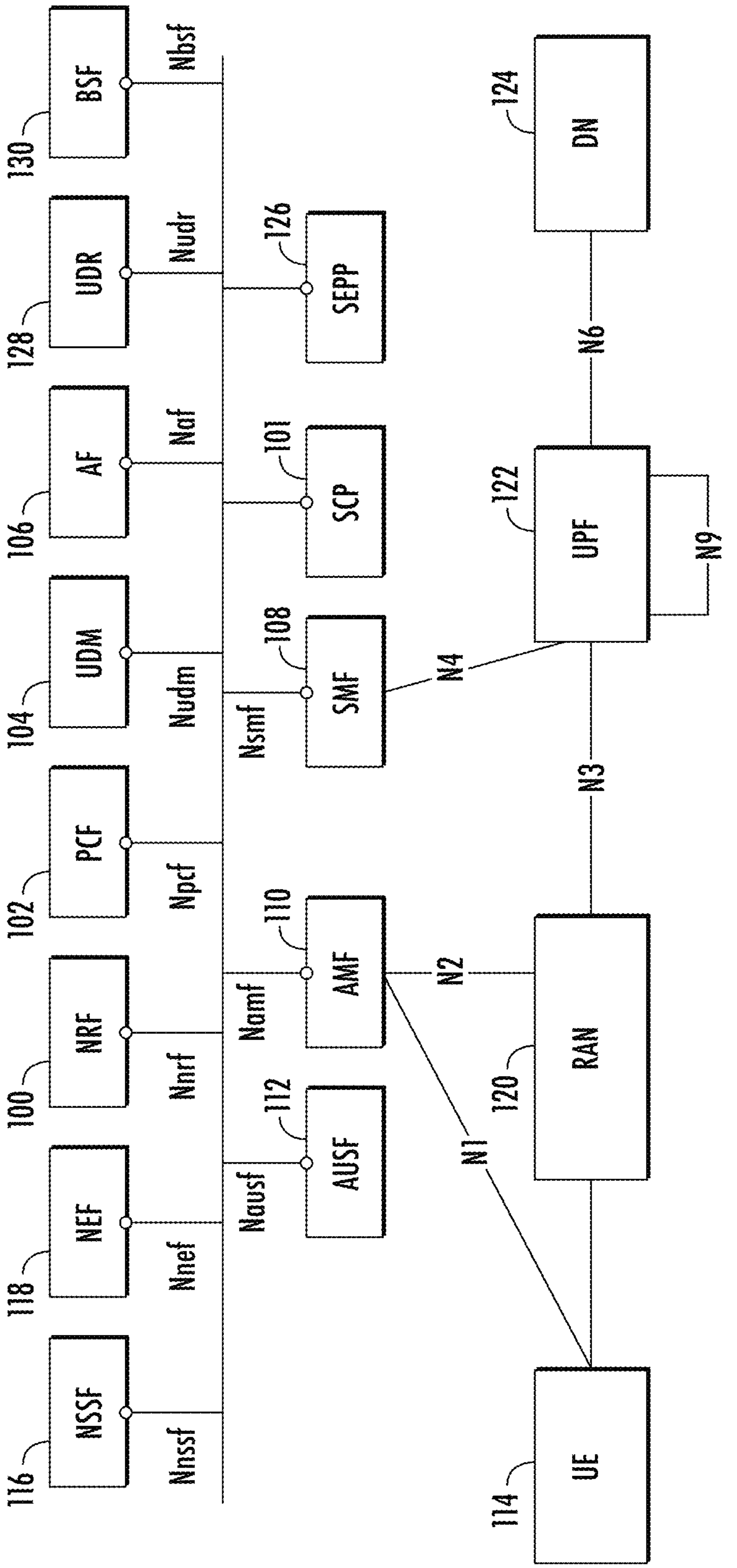
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

A SEPP 126 filters incoming traffic from another PLMN and can perform topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A SEPP filtering egress messages from consumer NFs in a PLMN is referred to as a consumer SEPP or C-SEPP. A SEPP that filters ingress messages directed to consumer NFs in a PLMN is referred to as a producer SEPP or P-SEPP. A given SEPP can function as a C-SEPP and a P-SEPP, depending on the role the SEPP is performing.

A unified data repository (UDR) 128 stores subscription data for UEs. A binding support function (BSF) 130 manages bindings between PDU sessions and PCFs.

As described above, one problem that can be present in 5G and subsequent generation networks occurs with inter-SCP routing when a producer NF instance becomes unreachable via a producer SCP instance, and the unreachability of the producer NF instance via the producer SCP instance is not communicated to consumer SCP instances. As a result, failed routing attempts and retransmissions are performed, which is inefficient and wastes network bandwidth.

Figure 2:
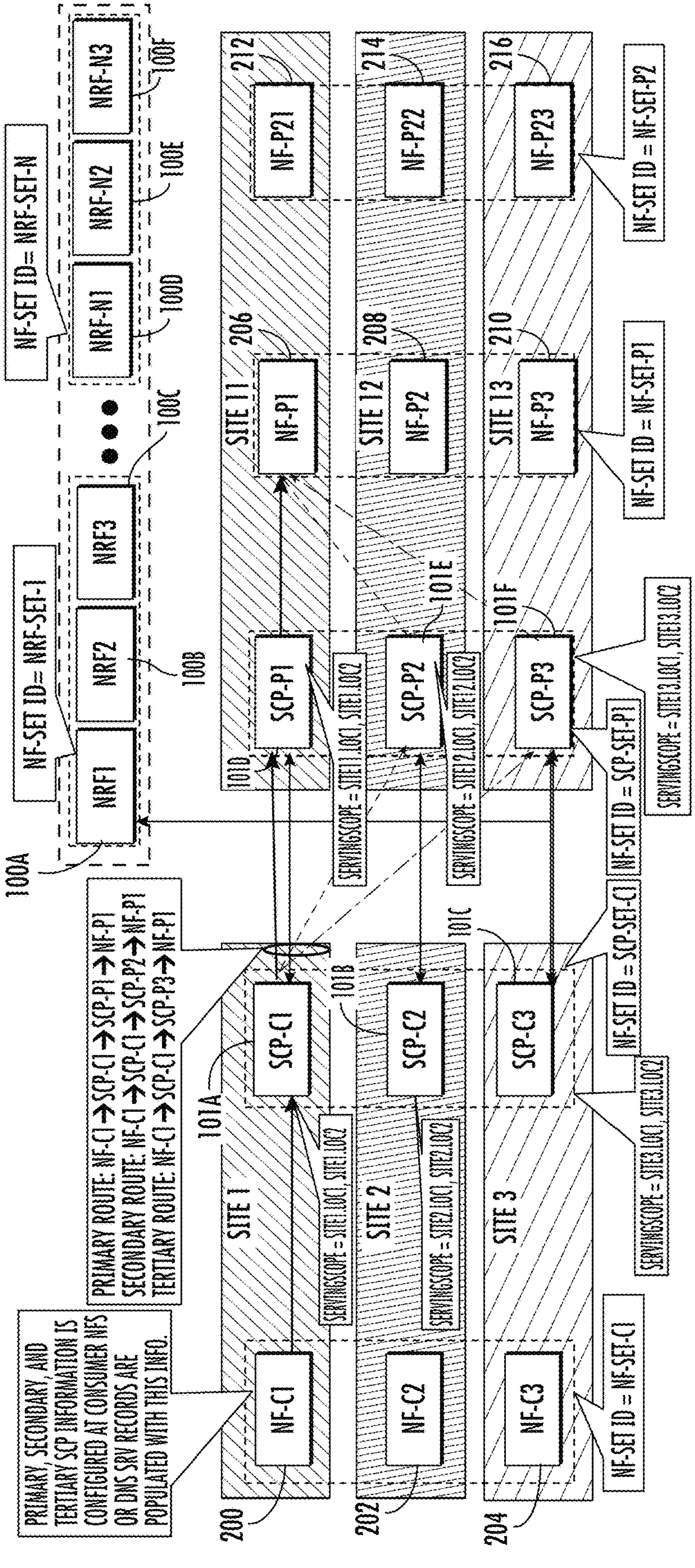
FIG. 2 is a network diagram illustrating an example network architecture for inter-SCP routing.

FIG. 2 is a network diagram illustrating an example network architecture for inter-SCP routing. Referring to FIG. 2, consumer SCP instances 101A, 101B, and 101C serve consumer NF instances 200, 202, and 204. Similarly, producer SCP instances 101D, 101E, and 101F serve producer NF instances 206, 208, 210, 212, 214, and 216. NRF instances 100A, 100B, and 100C form a first NRF set. NRF instances 100D, 100E, and 100F form a second NRF set. Sites 1, 2, and 3 are mated sites, and sites 11, 12, and 13 are mated sites.

As illustrated in FIG. 2, a 5G core (5GC) network deployment may have more than one SCP instance between consumer and producer NF instances, and routing of 5G SBI messages will be enabled by SCP instances available between the consumer and producer NF instances. This is known as inter-SCP routing, where a consumer SCP instance (SCP-C) is deployed/located near a consumer NF instance, and a producer SCP instance (SCP-P) is deployed/located near a producer NF instance. The consumer NF instance sends an SBI service request to the highest priority available consumer SCP instance in a georedundant deployment of SCP instances.

The consumer SCP instance selects a producer NF instance in the case of 3GPP communication model D. In the case of 3GPP communication model C, the consumer NF instance may select the producer NF instance, and the consumer NF instance forwards the message to the consumer SCP instance to be routed towards the producer NF instance. In both communication model C and model D, SCP-C selects the next hop SCP (SCP-P), i.e.; the SCP that can route the 5G SBI request message to the producer NF directly. A consumer SCP instance can connect to multiple next-hop SCP instances for a given/selected producer NF instance to handle the service request.

Each producer and consumer SCP instance registers with an NRF instance. The registration includes the SCP profile of the SCP instance, and the SCP profile includes the serving scope, locality, routing domain info, etc., required for inter-SCP SBI message routing. The consumer SCP instance learns/retrieves the SCP profile information from the NRF instance to identify/select the SCP-P instance to be used for routing of an inter-SCP SBI message towards a specific producer NF instance. Consumer NF instances can also discover the SCP profile information from the NRF instance to identify the SCP instance to be used for indirect communication.

Figure 3:
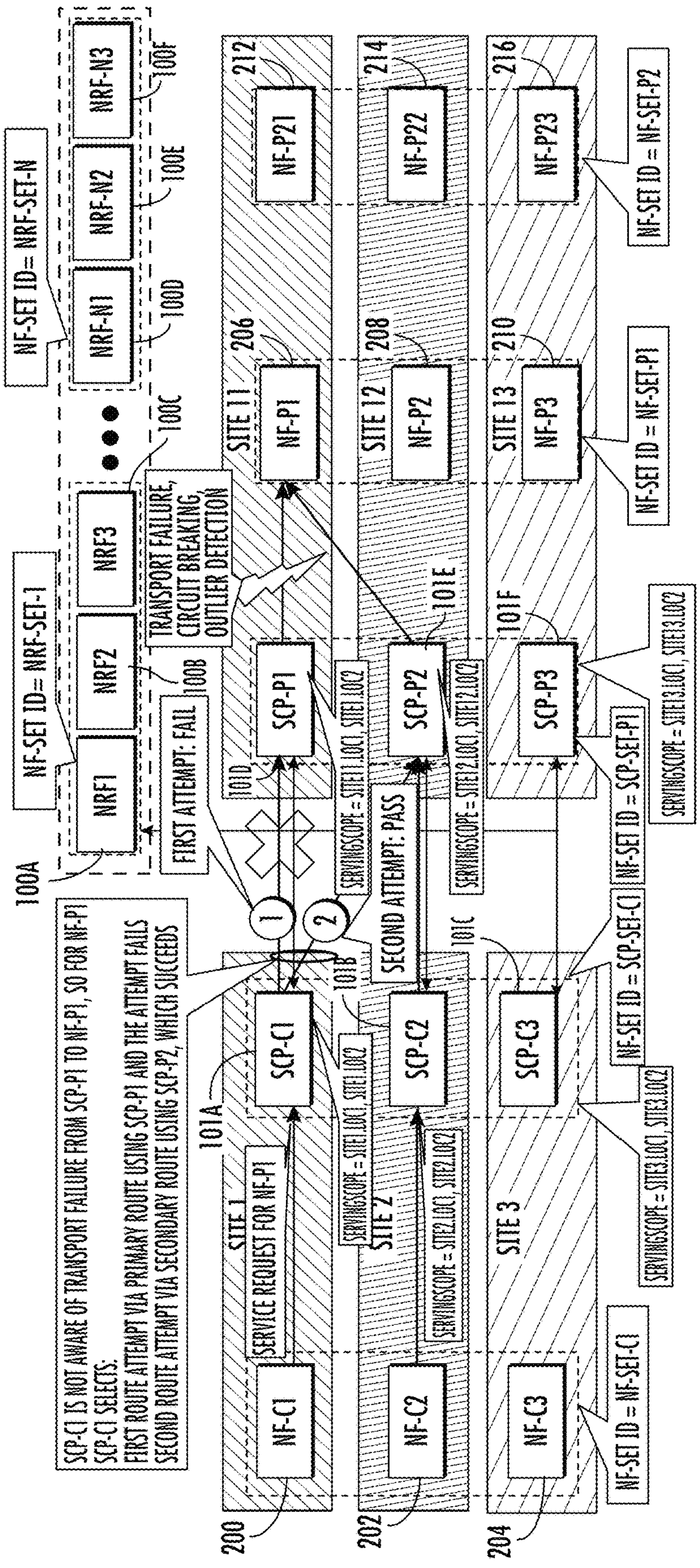
FIG. 3 is a network diagram illustrating inter-SCP routing where routing of an initial service-based interface (SBI) request message to a producer NF instance via one producer SCP instance fails, and the consumer SCP detects the failure and retransmits the SBI request message to the producer NF instance via an alternate producer SCP instance.

FIG. 3 is a network diagram illustrating inter-SCP routing where routing of an initial SBI request message to a producer NF instance via one producer SCP instance fails, and the consumer SCP instance detects the failure and retransmits the SBI request message to the producer NF instance via an alternate producer SCP instance. In the illustrated example, a transport failure occurs between producer SCP instance 101D and producer NF instance 206. Consumer SCP instance 101A is not aware of the transport failure. Accordingly, when consumer NF instance 200 sends a service request message directed to producer NF instance 206, SCP instance 101A receives the request and first attempts to route the request to producer NF instance 206 via producer SCP instance 101D. Because of the transport layer connection failure, the first attempt fails. In response to detecting the failure, consumer SCP instance 101A selects an alternate producer SCP instance, in this case, producer SCP instance 101E, and retransmits the service request to producer NF instance 206 via producer SCP instance 101E. Because a transport layer connection exists between producer SCP instance 101E and producer NF instance 206, the second attempt at forwarding the service request to producer NF instance 206 is successful. However, the failed first routing attempt via producer SCP instance 101A is undesirable and should be avoided.

Figure 4:
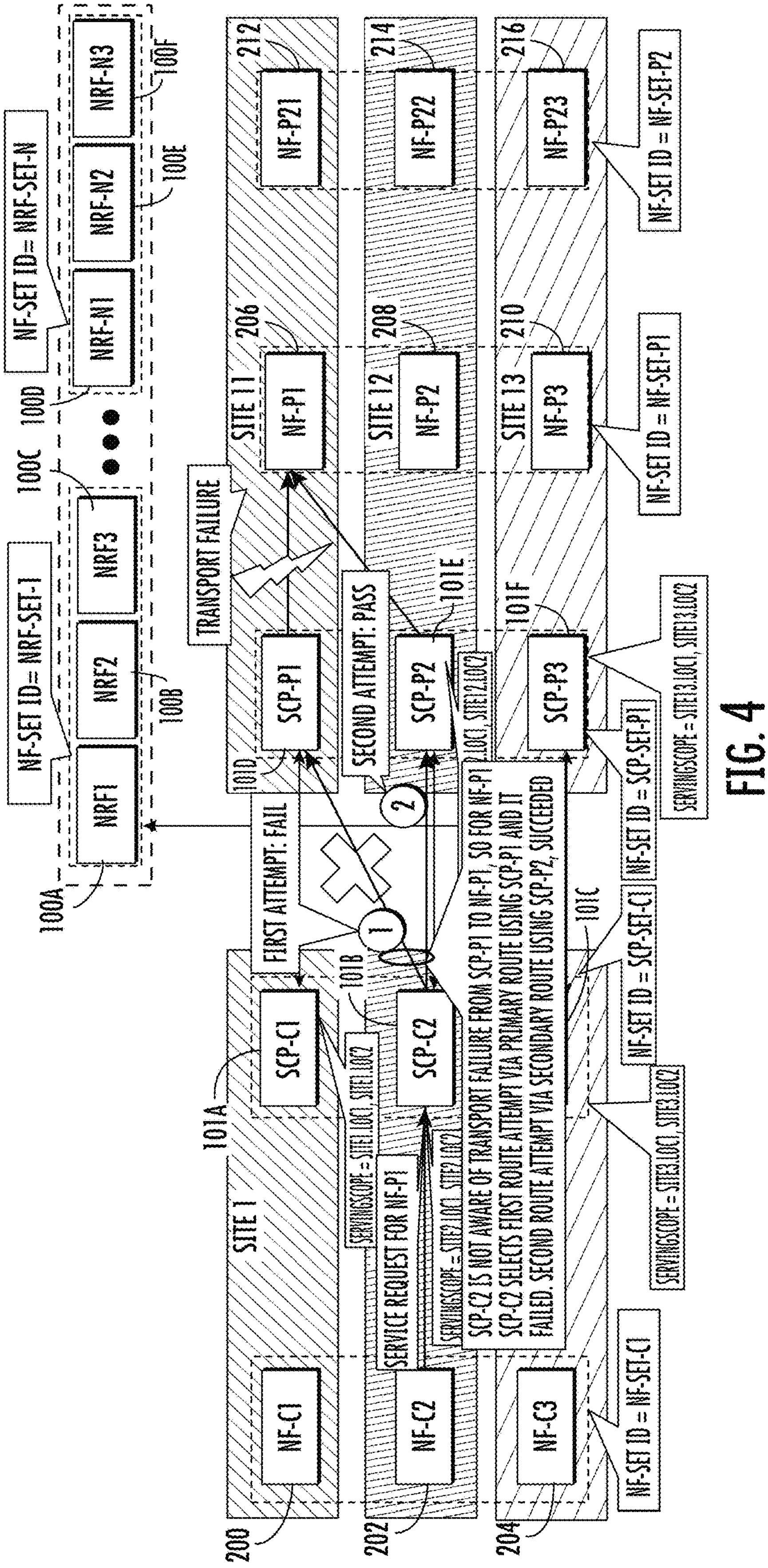
FIG. 4 is a network diagram illustrating another example of inter-SCP routing where routing of an initial SBI request message to a producer NF instance via one producer SCP instance fails, and the consumer SCP instance detects the failure and retransmits the SBI request message to the producer NF instance via an alternate producer SCP instance.

FIG. 4 is a network diagram illustrating another example of inter-SCP routing where routing of an initial SBI request message to a producer NF instance via one producer SCP instance fails, and the consumer SCP instance detects the failure and retransmits the SBI request message to the producer NF instance via an alternate producer SCP instance. In FIG. 4, like FIG. 3, a transport layer connection failure occurs between SCP 101D and producer NF instance 206, making producer NF instance 206 unreachable via producer SCP instance 101D. However, the consumer SCPs, such as SCP 101B, are unaware of the transport layer connection failure.

In the example illustrated in FIG. 4, consumer NF instance 202 sends a service request to producer NF instance 206 via consumer SCP instance 101B. Consumer SCP instance 101B receives the service request, selects producer SCP instance 101D as the next-hop SCP in reaching producer NF instance 206, and forwards the SBI request message to producer SCP instance 101D. Producer SCP instance 101D receives the request, determines that producer NF instance 206 is unreachable, and responds with an error message to consumer SCP instance 101B. Consumer SCP instance 101B selects an alternate next-hop SCP instance, in this case, SCP instance 101E, and forwards the service request to producer SCP instance 101E.

Producer SCP instance 101E has a transport layer connection with producer NF instance 206. Accordingly, producer SCP instance 101E forwards the service request to producer NF instance 206. The initial failed transmission of the service request from a consumer SCP to a producer SCP that cannot reach the target producer NF is wasteful of network and SCP processing resources and should be avoided.

To address the difficulties illustrated in FIGS. 3 and 4, producer SCPs maintain path status information in a custom or vendor-specific information element (IE) stored in the SCP profile of the producer SCP that the producer SCP communicates to the NRF. Consumer SCPs can subscribe with the NRF to obtain and also periodically receive updates to the SCP profiles of other SCP instances. The subscriptions can be created using the NFStatusSubscribe service operation. SCP profiles can be retrieved using the NFProfileRetrieval service operation. Table 1 shown below illustrates and example of the custom fields that may be present in the custom IE of the SCP profile to store reachability status for a producer NF via a given SCP instance.

TABLE 1

Custom IE for Storing Path Reachability Status for Producer NF

| Producer NF Instance ID | NF Service Instance ID | Path Reachability Status (Yes/No) | Status Check Date and Time |
|---|---|---|---|
| NF-P1 | NF-P1-svc-1 | No | 12:14:2023:05:00:00 |

In Table 1, the custom IE includes a producer NF instance ID value, an NF service instance ID value, a path reachability status value (yes or no), and a status check date and time. The custom IE is included in the SCP profile of the SCP, which typically only stores attributes relating to the SCP itself, rather than to paths to other nodes that are reachable or unreachable via the SCP. The status date check and time indicate the age of the path reachability information and can be used by the consumer SCP in determining whether the path reachability information is recent enough to use in making the next-hop SCP selection. If the consumer SCP determines that the status check date and time indicate that the path reachability information is older than a threshold time, the consumer SCP may ignore that path reachability information in making the next-hop SCP selection.

Including the custom IE as part of the SCP profile which is registered with the NRF enables other SCPs to obtain the path reachability status information through 3GPP-defined NFStatusSubscribe and NFProfile retrieval service operations. The receiving SCP may use the path reachability status information in selecting a next-hop SCP through which a producer NF and service are reachable, reducing the likelihood of failed routing attempts.

Figure 5:
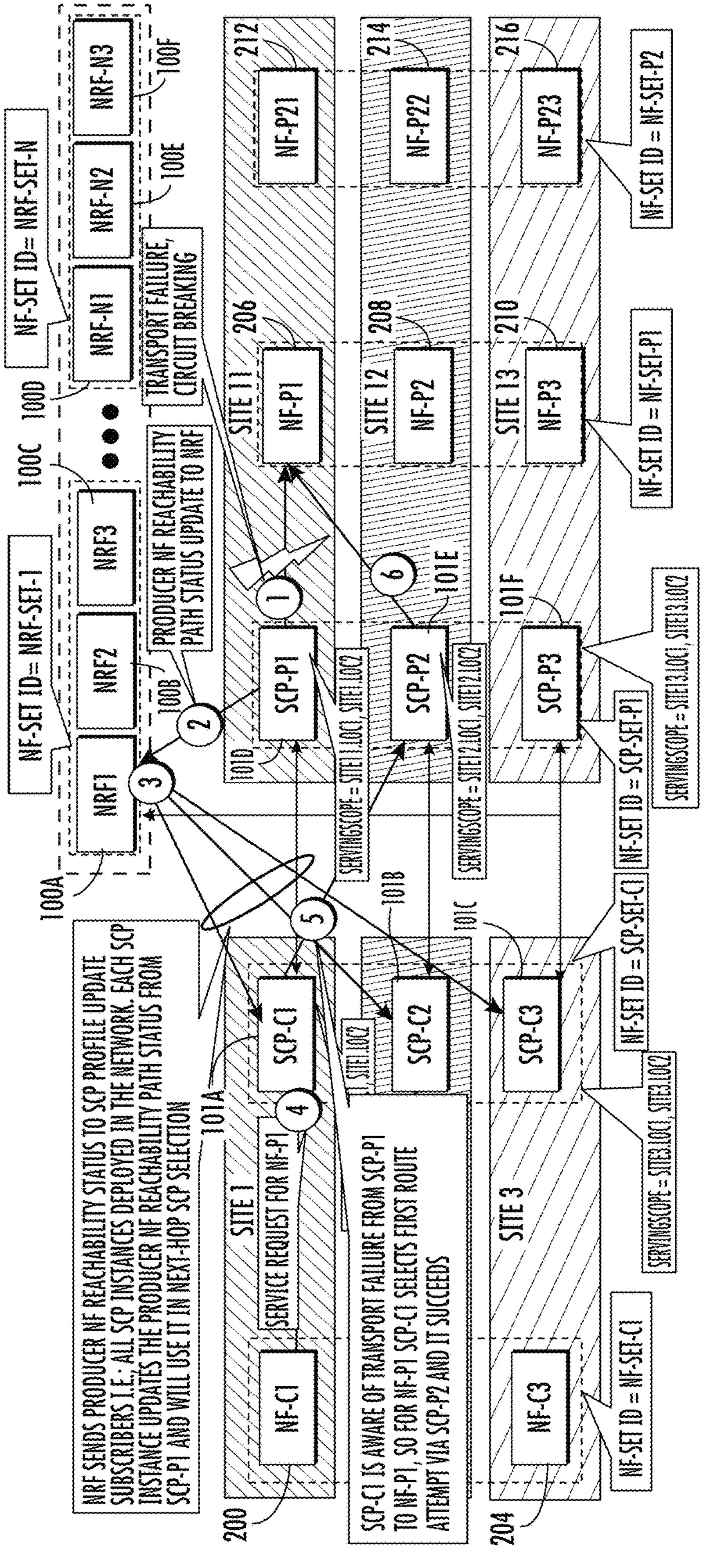
FIG. 5 is a network diagram illustrating inter-SCP routing where the producer SCP tracks producer NF instance path reachability information and communicates the producer NF instance path reachability information to the consumer SCP, and the consumer SCP uses the producer NF instance path reachability information to avoid selecting an SCP through which a producer NF instance is not reachable.

FIG. 5 is a network diagram illustrating inter-SCP routing where the producer SCP tracks producer NF instance path reachability information and communicates the producer NF instance path reachability information to the consumer SCP, and the consumer SCP uses the producer NF instance path reachability information to avoid selecting an SCP through which a producer NF instance is not reachable. Referring to FIG. 5, in step 1, producer SCP instance 101D determines that producer NF instance 206 is not reachable. Producer SCP instance 101D may determine that producer NF instance 206 is not reachable via synthetic monitoring where producer SCP instance 101D transmits status check messages to producer NF instance 206 and fails to receive a response to one of the status check messages within a timeout period. The status check message may be any suitable messages for which a response is expected within a timeout period. Examples of suitable status check messages are packet internet groper (PING) messages and hypertext transfer protocol (HTTP) OPTIONS messages. In another example, producer SCP instance 101D may determine that producer NF instance 206 is not reachable in response to failing to receive a response to an SBI request message sent to producer NF instance 206 within a timeout period.

After determining the path reachability status of producer NF instance 206, producer SCP instance 101D creates the custom IE including the path reachability status information for producer NF instance 206, adds the custom IE to the SCP profile of producer SCP instance 101D, and, in step 2, either registers or updates the SCP profile with NRF instance 100A. Producer SCP instance 101E may also update its SCP profile with NRF instance 100A and include, in the SCP profile, an indication that producer NF instance 206 is reachable via producer SCP instance 101E. Producer SCP instance 101E registers or updates its SCP profile with NRF 100.

In step 3, NRF 100 provides the SCP profile or updated SCP profile of producer SCP instance 101D to consumer SCP instances 101A, 101B, and 101C. The SCP profile may be communicated to consumer SCP instances 101A, 101B, and 101C in NF discovery response messages, subscription notification messages, or in response to periodic NF profile retrieval requests transmitted by SCP instances 101A, 101B, and 101C.

In step 4, consumer NF instance 200 sends an NF service request to consumer SCP instance 101A. Consumer SCP instance 101A selects the highest-priority next-hop SCP for reaching producer NF instance 206 that has a reachability status indicator that indicates that producer NF instance 206 is reachable. In this example, consumer SCP instance 101A selects producer SCP instance 101E as the next-hop SCP. In step 5, consumer SCP instance 101A forwards the SBI request message to producer SCP instance 101E. In step 6, producer SCP instance 101E forwards the SBI request message to producer NF instance 206. The failed routing attempt via producer SCP instance 101D is avoided.

Figure 6:
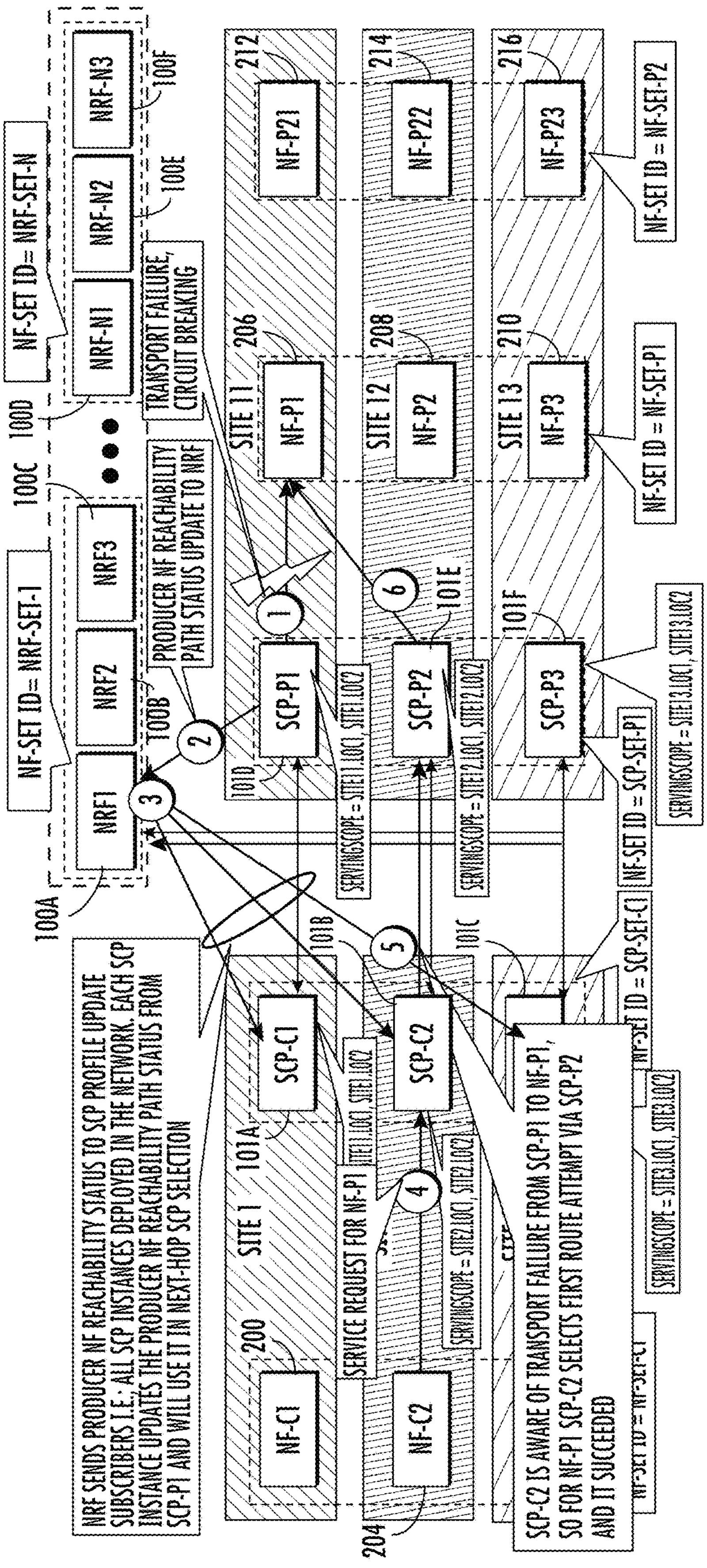
FIG. 6 is a network diagram illustrating another example of inter-SCP routing where the producer SCP tracks producer NF instance path reachability information and communicates the producer NF instance path reachability information to the consumer SCP, and the consumer SCP uses the producer NF instance path reachability information to avoid selecting an SCP through which a producer NF instance is not reachable.

FIG. 6 is a network diagram illustrating another example of inter-SCP routing where the producer SCP tracks producer NF instance path reachability information and communicates the producer NF instance path reachability information to the consumer SCP, and the consumer SCP uses the producer NF instance path reachability information to avoid selecting an SCP through which a producer NF instance is not reachable. Referring to FIG. 6, in step 1, producer SCP instance 101D determines that producer NF instance 206 is not reachable. Producer SCP instance 101D may determine that producer NF instance 206 is not reachable via synthetic monitoring, an SBI request message failure or other suitable method.

After determining the path reachability status of producer NF instance 206, producer SCP instance 101D creates the custom IE including the path reachability status information for producer NF instance 206, adds the custom IE to the SCP profile of producer SCP instance 101D, and, in step 2, either registers or updates the SCP profile with NRF instance 100A. Producer SCP instance 101E may also update its SCP profile with NRF instance 100A and include, in the SCP profile, an indication that producer NF instance 206 is reachable via producer SCP instance 101E. Producer SCP instance 101E registers or updates its SCP profile with NRF 100.

In step 3, NRF 100 provides the SCP profile or updated SCP profile of producer SCP instance 101D to consumer SCP instances 101A, 101B, and 101C. The SCP profile may be communicated to consumer SCP instances 101A, 101B, and 101C in NF discovery response messages, subscription notification messages, or in response to periodic NF profile retrieval requests transmitted by SCP instances 101A, 101B, and 101C.

In step 4, consumer NF instance 202 sends an NF service request to consumer SCP instance 101B. Consumer SCP instance 101B selects the highest-priority next-hop SCP for reaching producer NF instance 206 that has a reachability status indicator that indicates that producer NF instance 206 is reachable. In this example, consumer SCP instance 101B selects producer SCP instance 101E as the next-hop SCP. In step 5, consumer SCP instance 101B forwards the SBI request message to producer SCP instance 101E. In step 6, producer SCP instance 101E forwards the SBI request message to producer NF instance 206. The failed routing attempt via producer SCP instance 101D is avoided.

Figure 7:
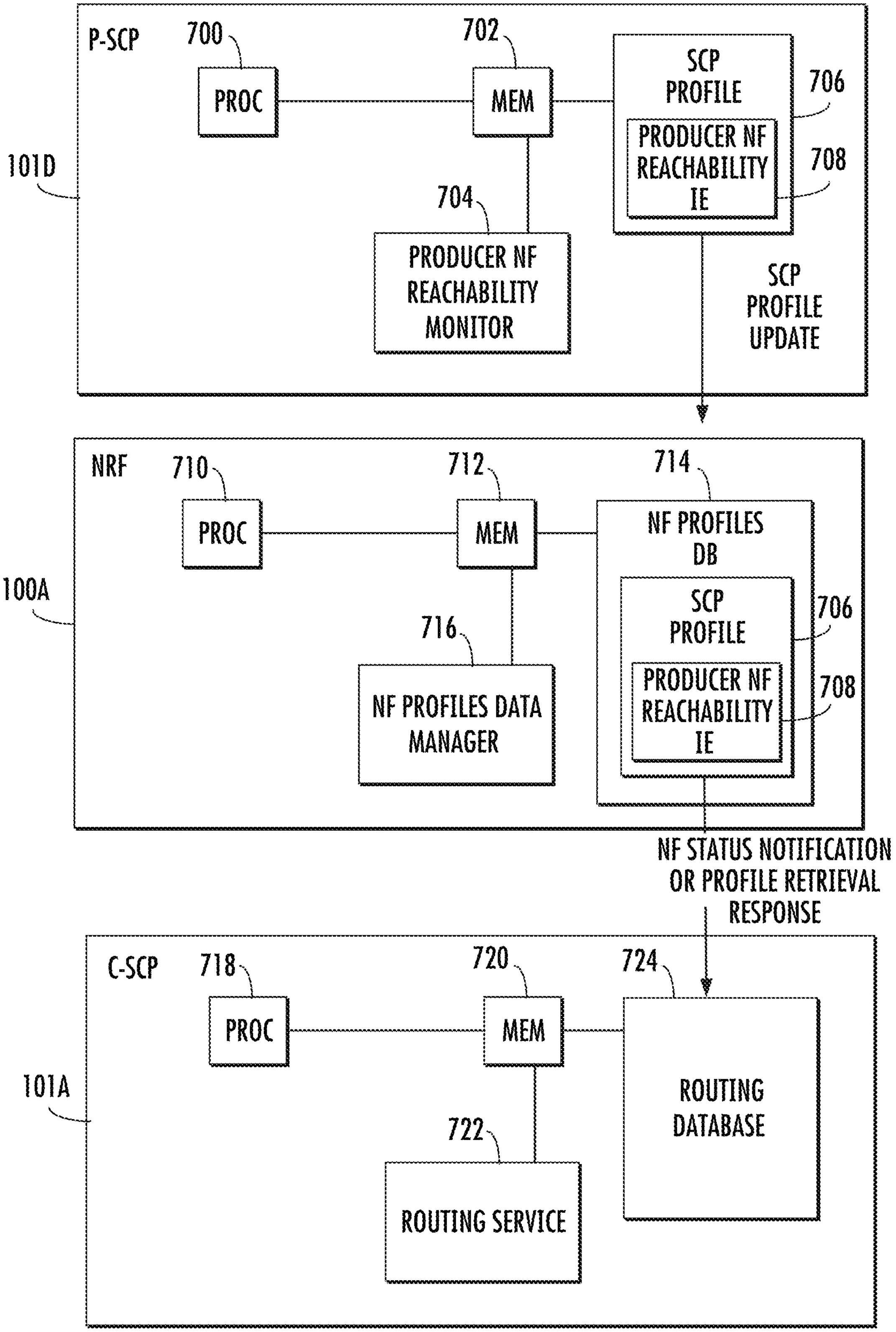
FIG. 7 is a block diagram illustrating exemplary architectures for a producer SCP instance, an NRF instance, and a consumer SCP instance for communicating and using producer NF instance path reachability information.

FIG. 7 is a block diagram illustrating exemplary architectures for a producer SCP instance, an NRF instance, and a consumer SCP instance for communicating and using producer NF instance path reachability information. Referring to FIG. 7, producer SCP instance 101D includes at least one processor 700 and a memory 702. Producer SCP instance 101D includes a producer NF reachability monitor 704 that tests paths associated with producer NF instances to determine whether the producer NF instances are reachable via producer SCP instance 101D. Producer SCP instance 101D includes an SCP profile 706 stored in memory 702. SCP profile 706 includes one or more producer NF reachability IEs 708, which identify a producer NF instance and an indication of whether the producer NF instance is reachable Because the IEs are communicated in the SCP profile, the IEs indicate that the producer NF instance is reachable or not reachable via the SCP instance corresponding to the SCP profile. In addition, communicating the indication of unreachability in the SCP profile enables distribution of the producer NF instance reachability information using standard 3GPP service operations, such as the NFUpdate service operation for communicating the indication to the NRF and the NFStatusNotify and NFProfileRetrieval service operations for communicating the indication to the consumer SCP.

NRF instance 100A includes at least one processor 710 and memory 712. NRF instance 100A further includes an NF profiles database 714 and NF profiles data manager 716. When NRF instance 100A receives an SCP profile update from producer SCP instance 101D, NRF instance 100A stores the updated SCP profile 706, including the producer NF reachability IE 708, in memory 712. NF profiles data manager 716 also communicates SCP profile 706 to consumer SCPs, such as consumer SCP instance 101A, in NFStatusNotify or NFProfileRetrieval response messages.

Consumer SCP instance 101A includes at least one processor 718 and memory 720. Consumer SCP instance 101A further includes a routing service 722 and a routing database 724. Routing service 722 performs next-hop SCP selection for SBI request messages destined for producer NFs that are accessible via one or more SCP hops. Routing service 722 uses routing information stored in routing database 724 to perform next-hop SCP selection. Routing database 724 may store indications that a producer NF is unreachable via a remote SCP instance when consumer SCP instance 101A receives an NFStatusNotify message or NFProfileRetrieval response message indicating that a remote producer NF instance is unreachable via a remote producer SCP instance. In FIG. 7, producer NF reachability monitor 704, NF profiles data manager 716, and routing service 722 may be implemented using computer executable instructions stored in memory and executed by one or more processors.

Figure 8:
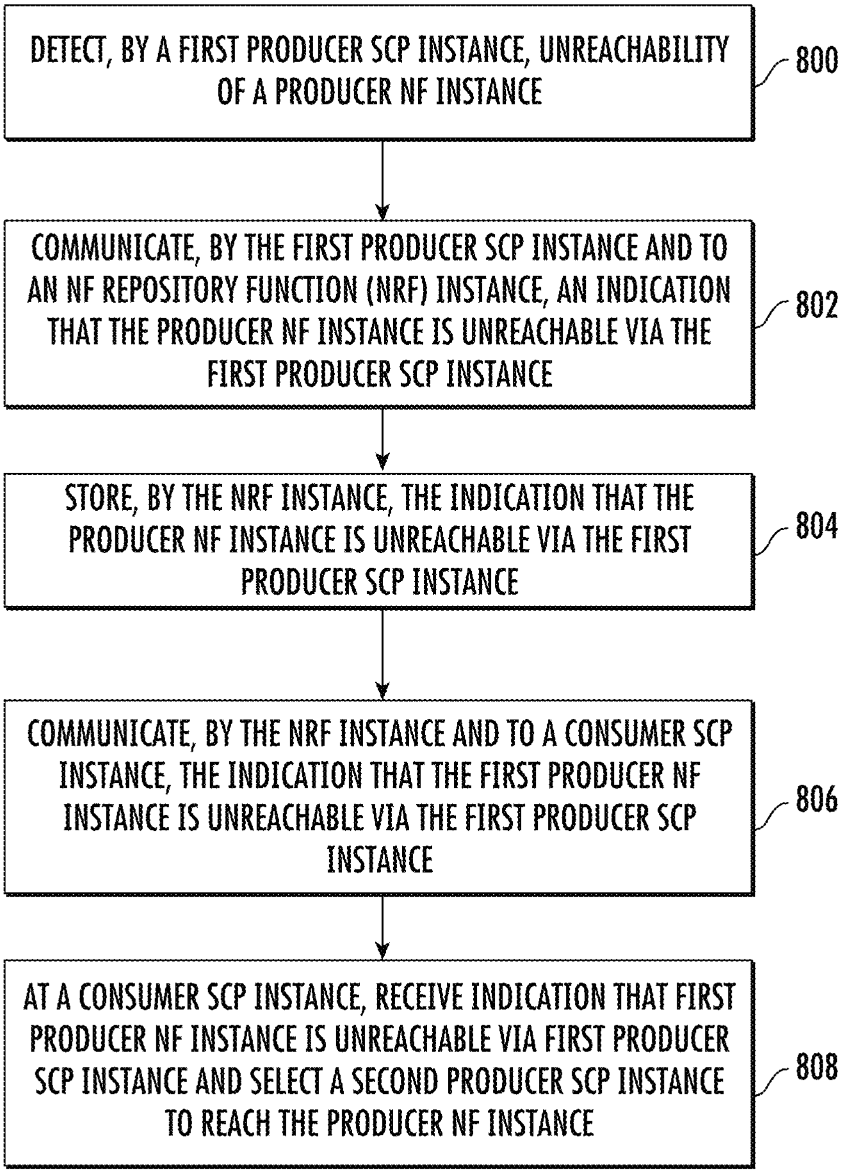
FIG. 8 is a flow chart illustrating an exemplary process for dynamic inter-SCP routing using remote producer NF instance path reachability information.

FIG. 8 is a flow chart illustrating an exemplary process for dynamic inter-SCP routing using remote producer NF instance path reachability information. Referring to FIG. 8, in step 800, the process includes detecting, by a first producer SCP instance, unreachability of a producer NF instance. For example, a producer SCP instance, such as producer SCP instance 101D, may test local producer NF instances for reachability using synthetic monitoring, transport layer messaging, or other suitable technique and determine that a producer NF instance is unreachable.

In step 802, the process further includes communicating, by the first producer SCP instance and to an NRF instance, an indication that the producer NF instance is unreachable via the first producer SCP instance. For example, a producer SCP instance, such as producer SCP instance 101D, may communicate an indication that producer SCP instance 101D cannot reach a particular producer NF instance by creating a custom or vendor-specific IE indicating that the producer NF instance is unreachable, add the IE to the SCP profile of producer SCP instance 101D, and communicate the SCP profile to the NRF using the NFUpdate service operation.

In step 804, the process further includes storing, by the NRF instance, the indication that the producer NF instance is unreachable via the first producer SCP instance. For example, an NRF instance, such as NRF instance 100A, may store, in the NF profiles database maintained by NRF instance 100A, the SCP profile including the indication that the producer NF instance is not reachable.

In step 806, the process further includes communicating, by the NRF instance and to a consumer SCP instance, the indication that the producer NF instance is unreachable via the first producer SCP instance. For example, an NRF instance, such as NRF instance 100A, may communicate the indication that the producer NF instance is not reachable via a particular SCP instance by communicating the SCP profile of the SCP instance including the indication of unreachability using 3GPP-defined operations for NF profile distribution, such as NFStatusNotify messages and NFProfileRetrieval response messages.

Exemplary advantages of the subject matter described herein include avoiding usage of a path for inter-SCP routing that will result in a routing failure at a consumer SCP for a given producer NF instance ID and service instance ID. The avoidance of failed routing attempts also reduces unnecessary inter-SCP signaling. Using the NRF to distribute dynamic updates of path status from a producer SCP for producer NF instance IDs and service instance IDs is efficient, because consumer SCPs are not required to implement non-standard interfaces with the NRF to receive the path status updates. The NRF is also not required to implement non-standard communication interfaces to receive and distribute producer NF reachability information. The solution described herein also reduces inter-SCP message latency due to a path failure for a given producer NF instance ID and service instance ID by avoiding retry/alternate rerouting at the SCP and delivering the messages on the first routing attempt.

The disclosure of each of the following references is hereby incorporated herein by reference in its entirety.

REFERENCES

1. $3^{rd}$ Generation Partnership Project; Technical Specification Group Core Network and Terminals; 5G System; Network Function Repository Services; Stage 3 (Release 18) 3GPP TS 29.510 V18.5.0 (2023-12)
2. $3^{rd}$ Generation Partnership Project; Technical Specification Group Services and System Aspects; Security architecture and procedures for 5G system; Stage 3 (Release 18) 3GPP TS 33.501 V18.5.0 (2024-03)

3. 3rd Generation Partnership Project; Technical Specification Group Core Network and Terminals; 5G System; Technical Realization of Service Based Architecture; Stage 3 (Release 18) 3GPP TS 29.500 V18.5.0 (2024-03)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for dynamic inter-service communication proxy (SCP) routing using remote producer network function (NF) instance path reachability information, the method comprising:

detecting, by a first producer SCP instance, unreachability of a producer NF instance, wherein detecting unreachability of the producer NF instance includes detecting unreachability of the producer NF instance via synthetic monitoring;

communicating, by the first producer SCP instance and to an NF repository function (NRF) instance, an indication that the producer NF instance is unreachable via the first producer SCP instance;

storing, by the NRF instance, the indication that the producer NF instance is unreachable via the first producer SCP instance; and communicating, by the NRF instance and to a consumer SCP instance, the indication that the producer NF instance is unreachable via the first producer SCP instance.

2. The method of claim 1 wherein communicating, to the NRF instance, the indication that the producer NF instance is unreachable via the first SCP instance includes transmitting an NF update message from the first producer SCP instance to the NRF instance.

3. A method for dynamic inter-service 5, communication proxy (SCP) routing using remote producer network function (NF) instance path reachability information, the method comprising:

detecting, by a first producer SCP instance, unreachability of a producer NF instance, wherein detecting unreachability of the producer NF instance includes detecting unreachability of the producer NF instance via synthetic monitoring;

communicating, by the first producer SCP instance and to an NF repository function (NRF) instance, an indication that the producer NF instance is unreachable via the first producer SCP instance, wherein communicating, to the NRF instance, the indication that the producer NF instance is unreachable via the first SCP instance includes transmitting an NF update message from the first producer SCP instance to the NRF instance, wherein communicating, to the NRF instance, the indication that the producer NF instance is unreachable via the first producer SCP instance includes creating a vendor-specific information element (IE) including the indication that the producer NF instance is unreachable, adding the vendor-specific IE to an SCP profile of the first producer SCP instance, and transmitting the SCP profile including the vendor-specific IE with the NF update message to the NRF instance;

storing, by the NRF instance, the indication that the producer NF instance is unreachable via the first producer SCP instance; and communicating, by the NRF instance and to a consumer SCP instance, the indication that the producer NF instance is unreachable via the first producer SCP instance.

4. The method of claim 3 wherein creating the vendor-specific IE comprises including, in the vendor-specific IE, a producer NF instance ID of the producer NF instance, an NF service instance ID associated with a service provided by the producer NF instance, the indication that the producer NF instance is unreachable, and a timestamp.

5. The method of claim 3 wherein communicating, to the consumer SCP instance, the indication that the producer NF instance is unreachable via the first SCP instance includes utilizing an Nnrf_NFManagement service.

6. The method of claim 5 wherein communicating, to the consumer SCP instance, the indication that the producer NF instance is unreachable via the first producer SCP instance utilizing the Nnrf_NFManagement service includes communicating the indication that the producer NF instance is unreachable via the first producer SCP instance in an NFStatusNotify message transmitted from the NRF instance to the consumer SCP instance, where the NFStatusNotify message includes the SCP profile of the first producer SCP instance and the SCP profile includes the vendor-specific IE carrying the indication that the producer NF instance is unreachable.

7. The method of claim 5 wherein communicating, to the consumer SCP instance, the indication that the producer NF instance is unreachable via the first producer SCP instance utilizing the Nnrf_NFManagement service includes communicating the indication that the producer NF instance is unreachable in an NFProfileRetrieval response message transmitted from the NRF instance to the consumer SCP instance, where the NFProfileRetrieval response message includes the SCP profile of the first producer SCP including the vendor-specific IE carrying the indication that the producer NF instance is unreachable.

8. A method for dynamic inter-service communication proxy (SCP) routing using remote producer network function (NF) instance path reachability information, the method comprising:

detecting, by a first producer SCP instance, unreachability of a producer NF instance;

communicating, by the first producer SCP instance and to an NF repository function (NRF) instance, an indication that the producer NF instance is unreachable via the first producer SCP instance;

storing, by the NRF instance, the indication that the producer NF instance is unreachable via the first producer SCP instance;

communicating, by the NRF instance and to a consumer SCP instance, the indication that the producer NF instance is unreachable via the first producer SCP instance;

receiving, by the consumer SCP instance, the indication that the producer NF instance is unreachable via the first producer SCP instance;

selecting, by the consumer SCP instance and in response to receiving the indication that the producer NF instance is unreachable via the first SCP instance, a second producer SCP instance for forwarding service-based interface (SBI) request messages to the producer NF instance; and forwarding, by the consumer SCP instance, an SBI request message to the producer NF instance via the second producer SCP instance.

9. A system for dynamic inter-service communication proxy (SCP) routing using remote producer network function (NF) instance path reachability information, the system comprising:

a producer SCP including at least one processor and a memory for detecting unreachability of a producer NF instance and communicating an indication that the producer NF instance is unreachable via the producer SCP, wherein the producer SCP is configured to detect unreachability of the producer NF instance via synthetic monitoring; and an NF repository function (NRF) including at least one processor and a memory for receiving, from the producer SCP, the indication that the producer NF instance is unreachable via the producer SCP, storing the indication that the producer NF instance is unreachable via the producer SCP, and communicating, to a consumer SCP instance, the indication that the producer NF instance is unreachable via the producer SCP.

10. The system of claim 9 wherein the producer SCP is configured to communicate, to the NRF, the indication that the producer NF instance is unreachable via the producer SCP by transmitting an NF update message from the producer SCP to the NRF.

11. A system for dynamic inter-service communication proxy (SCP) routing using remote producer network function (NF) instance path reachability information, the system comprising:

a producer SCP including at least one processor and a memory for detecting unreachability of a producer NF instance and communicating an indication that the producer NF instance is unreachable via the producer SCP wherein the producer SCP is configured to communicate, to the NRF, the indication that the producer NF instance is unreachable via the producer SCP by transmitting an NF update message from the producer SCP to the NRF, and wherein the producer SCP is configured to communicate, to the NRF, the indication that the producer NF instance is unreachable via the producer SCP by creating a vendor-specific information element (IE) including the indication that the producer NF instance is unreachable, adding the vendor-specific IE to an SCP profile of the producer SCP, and transmitting the SCP profile including the vendor-specific IE with the NF update message to the NRF; and an NF repository function (NRF) including at least one processor and a memory for receiving, from the producer SCP, the indication that the producer NF instance is unreachable via the producer SCP, storing the indication that the producer NF instance is unreachable via the producer SCP, and communicating, to a consumer SCP instance, the indication that the producer NF instance is unreachable via the producer SCP.

12. The system of claim 11 wherein the producer SCP is configured to include, in the vendor-specific IE, a producer NF instance ID of the producer NF instance, an NF service instance ID associated with a service provided by the producer NF, the indication that the producer NF instance is unreachable, and a timestamp.

13. The system of claim 11 wherein the NRF is configured to communicate, to the consumer SCP instance, the indication that the producer NF instance is unreachable via the producer SCP by utilizing an Nnrf_NFManagement service.

14. The system of claim 13 wherein the NRF is configured to communicate, to the consumer SCP instance, the indication that the producer NF instance is unreachable via the producer SCP utilizing the Nnrf_NFManagement service by communicating the indication that the producer NF instance is unreachable via the producer SCP in an NFStatusNotify message transmitted from the NRF to the consumer SCP instance, where the NFStatusNotify message includes the SCP profile of the producer SCP and the SCP profile includes the vendor-specific IE carrying the indication that the producer NF instance is unreachable.

15. The system of claim 13 wherein the NRF is configured to communicate, to the consumer SCP instance, the indication that the producer NF instance is unreachable via the producer SCP utilizing the Nnrf_NFManagement service by communicating the indication that the producer NF instance is unreachable in an NFProfileRetrieval response message transmitted from the NRF to the consumer SCP instance, where the NFProfileRetrieval response message includes the SCP profile of the producer SCP including the vendor-specific IE carrying the indication that the producer NF instance is unreachable.

16. A non-transitory computer readable medium having stored thereon executable instructions that when executed by a processor of a computer control the computer to perform steps comprising:

detecting, by a producer service communication proxy (SCP) instance, unreachability of a producer network function (NF) instance, wherein detecting unreachability of the producer NF instance includes detecting unreachability of the producer NF instance via synthetic monitoring;

communicating, by the producer SCP instance and to an NF repository function (NRF) instance, an indication that the producer NF instance is unreachable via the producer SCP instance;

storing, by the NRF instance, the indication that the producer NF instance is unreachable via the producer SCP instance; and communicating, by the NRF instance and to a consumer SCP instance, the indication that the producer NF instance is unreachable via the producer SCP instance.

* * * * *